US006296913B1

(12) United States Patent
D'Andrade

(10) Patent No.: US 6,296,913 B1
(45) Date of Patent: Oct. 2, 2001

(54) THREE DIMENSIONAL, DETAILED, SCULPTURED ITEM

(76) Inventor: Mary Ann D'Andrade, 3 Ten Eyck, White House Station, NJ (US) 08889

( * ) Notice: Subject to any disclaimer, the term of this patent is extended or adjusted under 35 U.S.C. 154(b) by 0 days.

(21) Appl. No.: 09/543,248

(22) Filed: Apr. 5, 2000

(51) Int. Cl.[7] .......... B32B 7/06

(52) U.S. Cl. .......... 428/40.1; 428/158; 428/311.11; 428/317.3; 63/2

(58) Field of Search .......... 428/27, 16, 158, 428/160, 40.1, 317.9, 311.11, 317.3; 63/2

(56) References Cited

U.S. PATENT DOCUMENTS

| | | | | |
|---|---|---|---|---|
| 2,975,538 | | 3/1961 | Murfin | 40/20 |
| 3,390,482 | | 7/1968 | Holtvoigt | 46/158 |
| 4,220,016 | | 9/1980 | Frenger | 63/2 |
| 4,280,695 | | 7/1981 | Stenehjem et al. | 272/8 |
| 4,419,395 | | 12/1983 | Sugimoto | 428/28 |
| 4,419,396 | | 12/1983 | Sugimoto | 428/40 |
| 4,581,008 | | 4/1986 | House | 156/219 |
| 4,744,514 | | 5/1988 | Gadoua | 239/36 |
| 4,788,088 | * | 11/1988 | Kohl | 428/34.5 |
| 4,830,690 | | 5/1989 | Cooper | 156/63 |
| 5,233,845 | | 8/1993 | D'Andrade | 446/385 |
| 5,384,171 | * | 1/1995 | Prucher | 428/34.4 |

* cited by examiner

*Primary Examiner*—Alexander S. Thomas
(74) *Attorney, Agent, or Firm*—Kenneth P. Glynn, Esq.

(57) ABSTRACT

The present invention is directed to decorative three-dimensional, detailed, sculptured items formed of foam plastic with contours and impressions of varying depth. It is attached to a desired surface via an adhesive layer. The items include detailed, sculptured, three-dimensional, predetermined ornamental creations on their front side with varying thicknesses and areas of impressions of varying thicknesses, and having substantially flat surfaces on their backs. There is also a reinforcement grid of a plurality of strands of material which have a tensile strength greater than the tensile strength of the semi-flexible material contained within the semi flexible material. There is an adhesive applied to the flat surface of the present invention item, which may be protected before its use by a removable, peelable non-adhesive layer that attaches to the back of the item over the applied adhesive.

7 Claims, 6 Drawing Sheets

THREE DIMENSIONAL, DETAILED, SCULPTURED ITEM

BACKGROUND OF THE INVENTION

1. Field of the Invention

The present invention is directed to decorative items which are three dimensional, detailed, sculptured items. These items may be used for jewelry or other purposes, and are in the form of detailed sculpturing with non-conductive, semi-flexible materials with adhesive attachments which may be applied to any adherable surface, e.g., on clothing or directly on the skin, or on any other desired surface. More particularly, the present invention involves such items which include a reinforcement grid within the semi-flexible materials.

2. Information Disclosure Statement

Decorative three dimensional sculptured items, such as jewelry, have been in existence for centuries and have been created in countless shapes and forms. Just as old and boundless are the means by which such items have been affixed, adapted and worn. Thus, in general, prior art on this topic describes the formation of different types of decorative items, especially jewelry, and the corresponding implements for the placement of such items.

Most prior art, in regard to the formation of decorative jewelry, calls for the use of precious metals, gems or similarly dense materials in its creation. The weight and cost of these materials create size limitations to the formation of the jewelry. Although the technology of lightweight plastic moldings and blown plastic foam have been applied to many applications, their use in forming decorative jewelry has been limited.

The typical applications of lightweight plastic moldings and blown plastic foam is exemplified in U.S. Pat. No. 4,280,695 to Jerome C. Stenehjem, to Stephen C. Jacobsen; 3,390,482 to J. H. Holtvoight, which show applications through free-standing forms that have mechanical or novelty applications.

U.S. Pat. No. 4,419,395 to Terutaka Sugimoto describes a perfumed pendant which has a three-dimensional configuration and comprises a front vinyl sheet which has a design printed thereon, a back vinyl sheet which has a design matting with the design on the front vinyl sheet printed thereon and welded at the outer peripheral edge thereof to the outer peripheral edge of the front vinyl sheet, a foam resilient padding is interposed between the front and back vinyl sheets to give the three-dimensional configuration to the pendant and a capsulated perfume layer laminated to the outer surface of the front vinyl sheet at a selected area of the front vinyl sheet outer surface.

Prior art that relates to the application of decorative jewelry to a person, usually depicts a pin, clasp or similar mechanical method of attachment. Those methods of attachments limit the application of jewelry to areas of a person or a persons clothes that accommodate the pin or the clasp. The attachment methods cause damage to the surface on which they are worn and significantly add to the cost and manufacturability of the jewelry. However, some prior art does show the attachment of jewelry through adhesives, as in the present invention, the distinctions from which are set forth below.

The prior art which pertains to adhesively attached jewelry is exemplified by the following:

U.S. Pat. No. 2,975,538 to Clifton H. Murfin describes an emblem and means for adhering it to flat, convex or concave surfaces. The emblem includes an adhesive pad but the adhesive is not entered to be applied to human skin or clothing and makes a seal intending to be permanent.

U.S. Pat. No. 4,220,016 to Rita K. Frenger describes a process for producing jewelry which is color sensitive to temperature. The temperature sensitive jewelry must be adhered directly to the skin in order to be functional, thus an adhesive strip is used. The adhesive strip described is created to be resilient, flexible and elastic and attaches to a flexible base of the jewelry so that the adhesive surface will form with the contours of the skin to assure adequate thermoconductivity.

U.S. Pat. No. 4,419,396 to Terutaka Sugimoto describes three-dimensional perfumed seals which may be worn as brooches or pendants. In more detail, it describes a three-dimensional seal which comprises a vinyl base sheet, an adhesive layer which is applied to one surface of said base sheet, a release paper which is applied to one surface of said adhesive layer opposite from said base sheet, a foam synthetic resin padding material which is disposed on the surface of said base sheet opposite from said adhesive layer, a covering vinyl sheet sandwiching said padding material in cooperation with said base sheet having a design printed on one of the opposite surfaces thereof, and a capsulated perfume layer laminated to the covering vinyl sheet at the area where said design is present. These products are crudely three dimensional at best and lack any detail and sculpturing. In fact, the details are printed on the product and would not necessarily be distinguishable merely by the contours. These contours are simplistic and are made with covered vinyl which is welded onto the base and pulls down on the foam to form undulations. The undulations are not capable of abrupt changes in direction, e.g. a sharp chin or squared cap. These are all mathematically arcuated and do not have any indentations or impressions which have only partial depths to create actual sculpturing. These products are not capable of partial indentations or impressions due to inherent limitations of the methods of formation.

U.S. Pat. No. 4,581,088 to Robert E. House sets forth a process for creating shaped imitation jewels to be adhered to a persons fingernails. The process or means by which imitation jewels is to be adhered to a person is not addressed.

U.S. Pat. No. 4,744,514 to Susan M. Gadoua describes a laminated, flexible, lightweight scent-carrying ornament which has an adhesive backing that permits the ornament to be applied to one's personal clothing. The laminated construction comprises an open weave top lamination, an absorbent center lamination, and an adhesive backed bottom lamination, all of the laminations have been joined or fused together to form a single unit.

U.S. Pat. No. 4,830,690 to Diane Cooper describes a process by which adhesive is used to color an art and craft object. The adhesive is not used to adhere jewelry or any other similar item.

U.S. Pat. No. 5,233,845 to Bruce M. D'Andrade describes decorative, detailed, three-dimensional, sculptured jewelry which may be worn either directly on a person's body, clothing, or otherwise via an adhesive layer. The jewelry includes a sculptured three-dimensional predetermined ornamental design on its front side having a substantially flat surface on its back. The design has peaks and impressions with varying elevations to create true, detailed sculptured results. There is an adhesive applied to the flat surface of the ornamental design. The adhesive is protected before its use by a removable, peelable non-adhesive layer that attaches to the back of the ornamental design over the applied adhesive.

The ornamental design is created from non-conductive, plastic material. The ornamental design is attached, to the area of the users preference, by removing the peelable protective layer from the adhesive coating on the flat side of the ornament and pressing the adhesive against the preferred surface.

U.S. Pat. No. 5,233,845 describes "soft" jewelry which is adhered to a desired surface. However, it has been recently discovered that surprising advantages may be achieved to such devices to enable use of these devices in other, more demanding applications than jewelry, as well as jewelry. More specifically, it is an object of the present invention to achieve "soft" items such as in the aforesaid prior art, but with internal superstructures, yet having the soft semi-flexible "feel" as the prior art sculptured jewelry. Unlike the devices taught in U.S. Pat. No. 5,233,845, the present invention devices remain soft on the outside, yet are more bend resistant to assist in maintenance of adherence and are stronger, resisting stretching, tearing, ripping apart and other destructive forces by the use of an internal reinforcement grid not heretofore taught.

Thus, the prior art does teach that items may be made from lightweight plastic moldings and blown plastic foam which are made to give realistic three-dimensional detailed sculpturing having partial and full impressions therein yet contains reinforcement for durability in expanded applications by the use of hidden, imbedded reenforcement grids.

Notwithstanding the prior art, the present invention is neither taught nor rendered obvious thereby.

SUMMARY OF THE INVENTION

The present invention is directed to decorative three-dimensional, detailed, sculptured items formed of foam plastic with contours and impressions of varying depth. It is attached to a desired surface via an adhesive layer. The items include detailed, sculptured, three-dimensional, predetermined ornamental creations on their front side with varying thicknesses and areas of impressions of varying thicknesses, and having substantially flat surfaces on their backs. There is also a reinforcement grid of a plurality of strands of material which have a tensile strength greater than the tensile strength of the semi-flexible material contained within the semi flexible material. There is an adhesive applied to the flat surface of the present invention item, which may be protected before its use by a removable, peelable non-adhesive layer that attaches to the back of the item over the applied adhesive.

BRIEF DESCRIPTION OF THE DRAWINGS

The invention will be more fully understood by referring to the following detailed specification and the claims set forth herein, taken in connection with the drawings attached hereto wherein:

DETAILED DESCRIPTION OF THE PRESENT INVENTION

Figure 1:
Fig. 1 PRIOR ART
FIG. 1 illustrates a front oblique view of prior art decorative three dimensional jewelry.

The present invention is, as mentioned, directed towards detailed, decorative, three-dimensional, sculptured items which may be applied to any desired flat surface which accepts adhesive e.g. a wall, a table, a refrigerator, etc. or, as jewelry, may be worn anywhere on the body, clothing or otherwise. The term "three dimensional sculptured" item, as used herein, means having variable thickness on at least its front surfaces so as to create selected elevations, i.e., peaks and impressions which may include abrupt directional changes, in a predetermined arrangement so as to create a desired or predetermined design and appearance. Thus, the term refers to the physical characteristics of the product. Such products could take the form of picture framed three dimensional sculptured presentations, mass produced works of sculpture with flat bottoms, three dimensional jewelry and other semi-flexible three dimensional sculptured items, ranging from hood ornaments for a toy vehicle to stick on items from the circus to three dimensional promotional items such as logos and mascots, used in commerce.

Historically, decorative jewelry has been created from precious metals or equally as dense materials. The weight of these materials has created size and design limitations to the formation of jewelry, and has limited the areas on which such jewelry could be comfortably worn. Similarly, traditional jewelry requires a chain, pin, clasp, or other mechanical device that limits the application of decorative jewelry to a particular area of the body, clothes or otherwise.

Decorative, three dimensional jewelry has prehistoric origins. However, it has only been in recent years that modern technology and materials have affected societies attitudes about what jewelry can be and how it can be applied. The decorative three dimensional items of the present invention used as jewelry eliminates the limitations of traditional jewelry and offers substantial advantages. Additionally, the decorative, three dimensional items of the present invention may be used as ornamentation other than as jewelry, e.g. office, home or school desks or wall attachments, picture frames, etc.

The present invention item is lightweight, formed from semi-flexible plastic material, e.g. semi-flexible molded plastic, and may be created, for example, by partially blown plastic foam. Alternatively, polymer coated molds with foamed in situ centers may be used. Other processes similar to these may also be employed. The lightweight construction of the present invention item may be molded into any predetermined three-dimensional shape and may take on any sculptured configuration imagined, with a topography having impressions or low points at varying elevations. Additionally, this lightweight plastic material is nonconductive and noncorrosive eliminating traditional metal-formed problems of tarnishing, discolorization of the skin, expense of precious metals, related theft concerns, etc. Furthermore, the use of the present invention for non-jewelry applications creates an inexpensive, lightweight, non-conductive, non-corrosive product which eliminates or reduces injury prospects which might otherwise occur with hard plastic molded products or wood or metal products.

Within the main structure, i.e. the semi-flexible material portion of the present invention item, is a structurally enhanced grid of material which has a tensile strength greater than the semi-flexible material. By this is meant that the grid is stronger than the semi-flexible material and the items cannot, therefore, be pulled apart as easily, and, in some cases, cannot be pulled apart at all. Thus, the disadvantage that occurs with semi-flexible materials, ripping, tearing, pulling apart, etc. is reduced or eliminated.

The back side of the present invention items will be formed to be substantially flat, and will be coated with an adhesive. This formation will allow the flat surfaces of the item to be securely adhered to any area of a smooth, flat surface, or on a persons skin, clothing or otherwise. The use of the adhesive, in place of other traditional fastening devices such as chains, pins and clasps, screws, etc., removed the limitations of where and how the item can be applied. Similarly the adhesive removes the added costs of other mechanical fasteners and adds to item's manufacturability. To ensure ease of use for the adhesive fastener, a peelable, removable protective layer is placed over the adhesive on the flat side of the item. This layer prevents the item from adhering to other surfaces until the user so desires. When the item is to be adhered, the protective layer is pealed off the adhesive and discarded. The item is then placed against the surface, to which it is to be applied, and pressed firmly. The adhesive will adhere the item to the desired surface and will remain in such a location until removed. Optionally, multiple backings may be supplied to the user so that repeated storage, use and reuse is achieved. When one backing loses its adhesiveness, a new, e.g. double backed adhesive tape, cut to the contour of the device, will be used to replace it.

Figure 2:
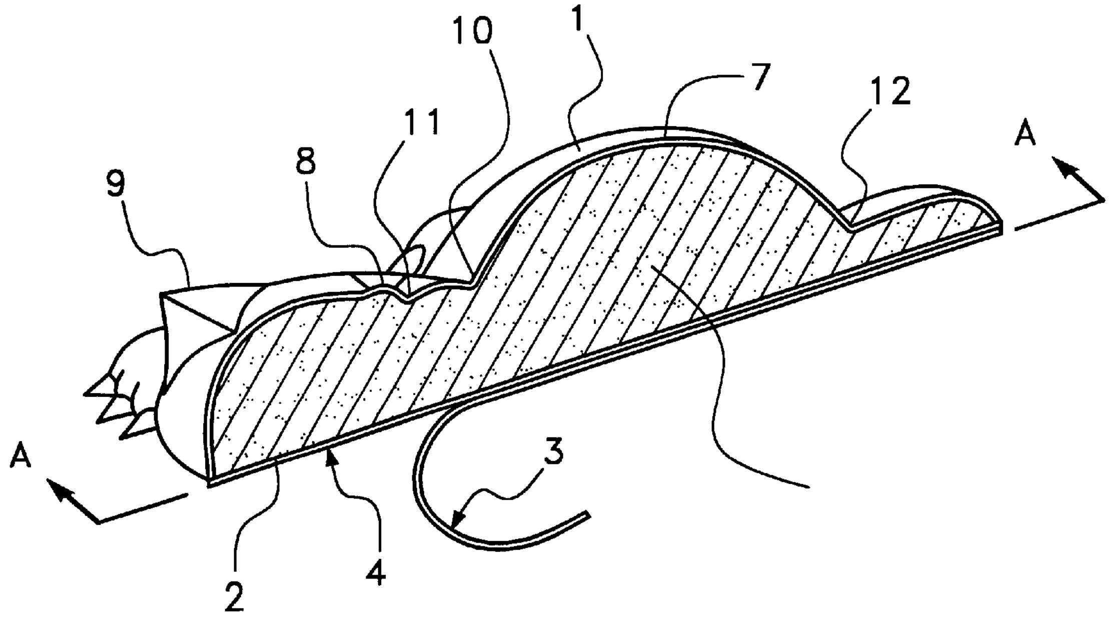
Fig. 2 PRIOR ART
FIG. 2 shows an oblique cross-sectional view of prior art shown in FIG. 1 taken along line A–A'.
Figure 3:
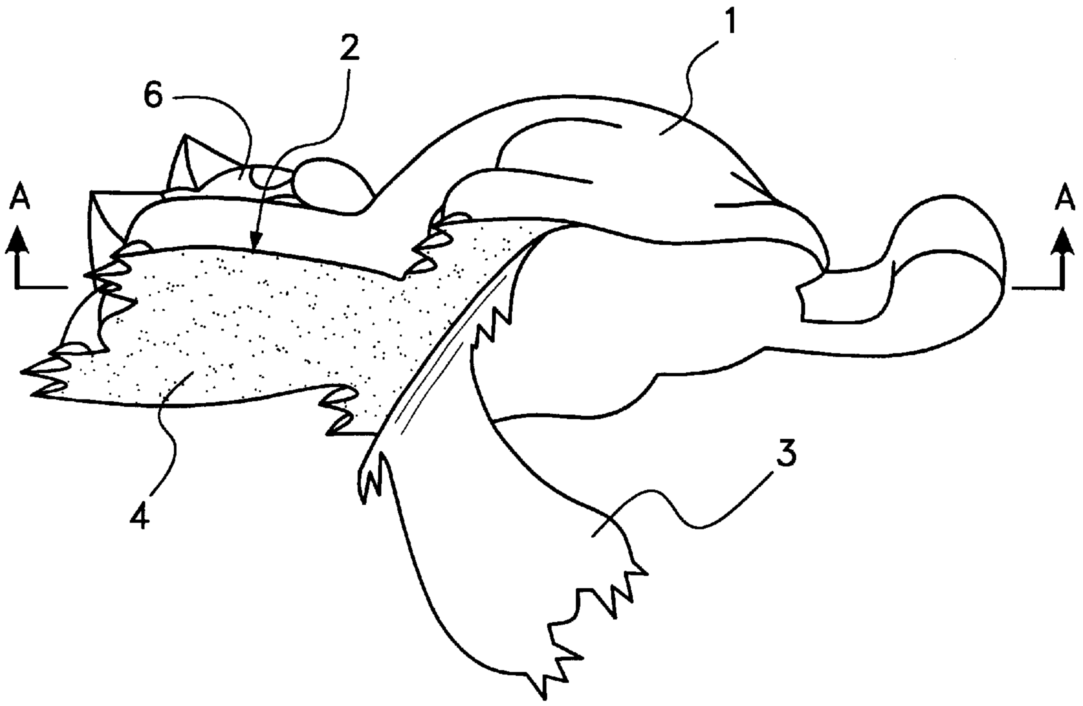
Fig. 3 PRIOR ART
FIG. 3 illustrates a rear oblique view of prior art present invention shown in FIGS. 1 and 2.

FIGS. 1, 2 and 3 illustrate prior art from U.S. Pat. No. 5,233,845. Referring now to FIG. 1, there is shown an oblique front view of the prior art three dimensional sculptured jewelry. The embodiment consists of a decorative three dimensional sculptured ornamental design 1 and a flat back surface 2. It should be noted that both the peaks and the impressions thereon having varying elevations above the back surface 2. This is vividly shown in FIG. 2.

FIG. 2 show s an oblique view of a cross-sectional cut of the prior art decorative three dimensional jewelry 1 showing in FIG. 1, cut along cross-sectional line A–A'. The oblique view from FIG. 2 shows cross-sections of the laminations and the semi-flexible molded blown foam material 5, which creates an embodiment of detailed, decorative three dimensional, sculptured ornamental jewelry 1. FIG. 2 shows a cross-section of the flat back surface 2 of the decorative three dimensional jewelry 1, the cross-section of the adhesive layer 4 that coats the flat back surface 2, and the cross-section of the protective, peelable, removable layer 3, that protects the adhesive layer 4 and has the same dimensions of the flat back surface 2. FIG. 2 shows the protective, peelable, removable layer 3 in the partially removed position, exposing half of adhesive layer 4. In addition, FIG. 2 illustrates the sculptured front peaks typified by peaks 7, 8, and 9 and impressions typified by is impressions 10, 11, and 12. These peaks and impressions have varying elevations relative to the back surface 2, creating true sculptured detail.

The view of the partially removed protective, peelable, removable layer 3 of prior art jewelry 1 from FIGS. 1 and 2, is shown in FIG. 3. FIG. 3 shows an oblique view of the flat back surface 2 of the decorative, three dimensional, sculptured, ornamental jewelry 1. FIG. 3 also shows the protective, peelable, removable layer 3 in its partially removed state, exposing the adhesive layer 4 that covers the flat back surface 2.

To adhere the decorative, three dimensional, sculptured, ornamental jewelry 1 to any part of a person's body, clothes, or otherwise, the protective, peelable, removable layer 3 is removed, exposing the adhesive layer 4. The flat back surface 2 of the decorative three dimensional sculptured ornamental jewelry is then pressed against the surface of the desired location, The adhesive layer 4 then temporarily adheres the semi-flexible molded blown foam material 5 of the decorative three dimensional sculptured ornamental jewelry 1 to any surface on which it is applied. The foregoing aspects of the prior art are incorporated into the present invention, but this prior art does not teach or suggest the enhanced devices of the present invention using beneficial high strength grid within the semi-flexible blown foam material.

A critical feature of the present invention is the use of strength enhancing grid work. The grid work is made up of a plurality of strands of material which have greater strength than the semi-flexible blown plastic core. These strands may be individual strands arranged in a single plane or in multiple planes or may be shaped in a skeletal form for the particular molded shape of the end product. The strands may be metal or plastic or other material and may be rigid, semi-flexible or flexible. (As used herein, both referring to the core material and to the grid, the word "semi-flexible" means that it holds its shape, but is bendable or compressible. The term "flexible" means yielding. Thus, the plastic mesh typically used for retail packaging of onions would be semi-flexible whereas cooked spaghetti would be flexible.)

Figure 4:
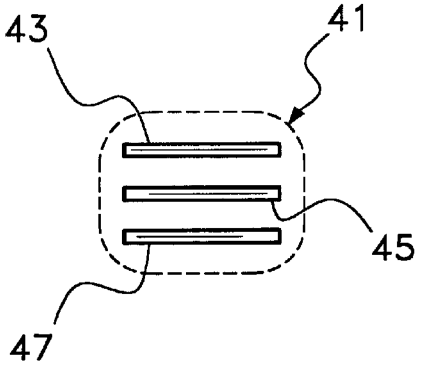
FIGS. 4 and 5 show top and side views of two embodiments of reinforcement grids which may be used in the present invention devices.
Figure 5:
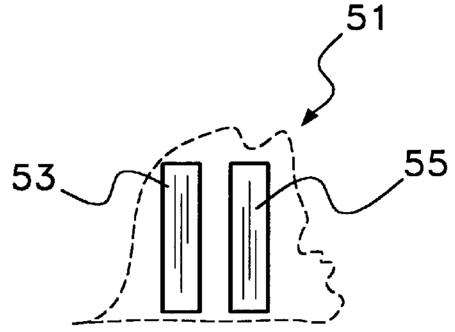

FIGS. 4 and 5 show a present invention arrangement for the grid in its simplest form. Thus, FIG. 4 shows a top view of one embodiment of the present invention wherein dotted line 41 simply represents a core, semi-flexible material such as blown plastic or blown foam plastic for a present invention device. In this case, flexible plastic strands 43, 45 and 47 are arranged in parallel to establish a flat plane of reinforcement for a present invention device and are embedded in the core 41. While strands 43, 45 and 47 are shown in parallel, they could be non-parallel, or overlapping.

FIG. 5 shows a side view of another present invention concept wherein core 51 represents the semi-flexible core material and vertically positioned flat strands 53 and 57 are embedded therein for enhanced strength.

FIGS. 6 through 15 show preferred embodiments of the present invention device grids wherein strands are interconnected with one another to form a single infrastructure.

Figure 6:
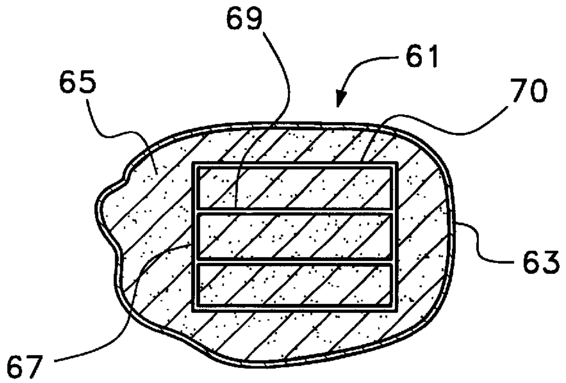
FIG. 6 shows a top cut view of a present invention device with a flat reinforcement grid.

FIG. 6 shows a top cut view of a present invention device 61 with an integral skin 63 and blown foam material 65. Contained therein is grid 70 having interconnected strands such as strands 67 and 69. Grid 70 is shown in a flat horizontal plane.

Figure 7:
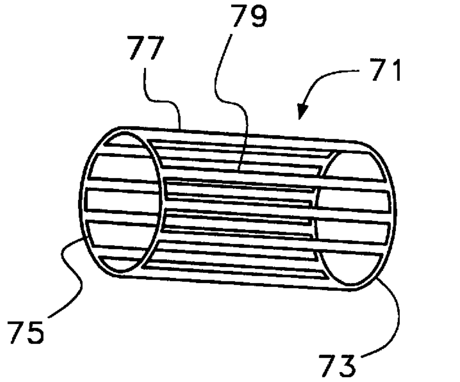
FIG. 7 shows a closed-loop single layer is reinforcement grid used in one embodiment of a present invention device.

FIG. 7 shows a closed-loop three dimensional single layer reinforcement grid 71 for use in the present invention. In its cylindrical form as shown, it includes hoop ends 73 and 75 interconnected with parallel strands such as strands 77 and 79.

Figure 8:
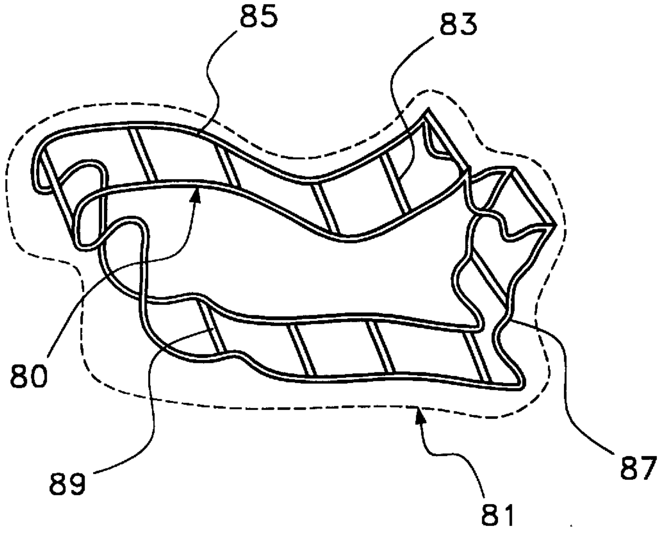
FIG. 8 illustrates a side oblique see through view of another embodiment of a present invention device.

FIG. 8 shows a side oblique view of another present invention device in part with dotted line 81 representing the semi-flexible core of a molded structure such as a dog with infrastructure interconnecting grid 80 which contains parallel side strands 85 and 87 with cross connecting strands such as top strand 83 and bottom strand 89.

Figure 9:
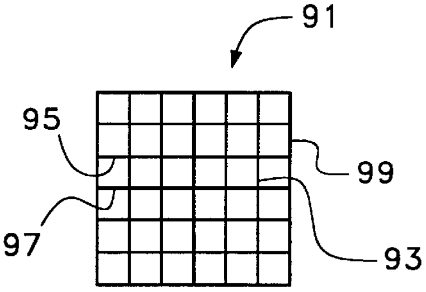
FIGS. 9 and 10 show flat and three dimensional lattice grids for use in present invention devices.
Figure 10:
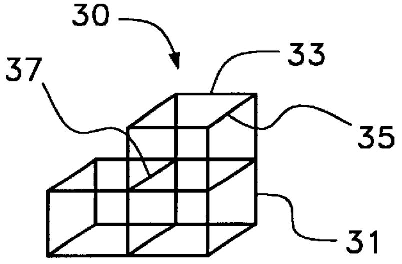

FIGS. 9 and 10 show two dimensional and three dimensional rectangular array grids which may be used in present invention devices. Thus, FIG. 9, grid 91 has parallel strands 93 and 99 and intersecting parallel strands 95 and 97 which are at right angles thereto. Grid 91 may be interwoven plastic such as polyethylene, polypropylene, polyvinyl chloride, polyvinyl alcohol, polyurethane, plastic coated metal wire or the like. In FIG. 10, three dimensional grid 30 has strands in the x, y, and z axes such as strands 31, 33, 35 and 37. These could be arranged to build up structures of varying heights, widths and depths to accommodate predetermined mold shapes.

Figure 11:
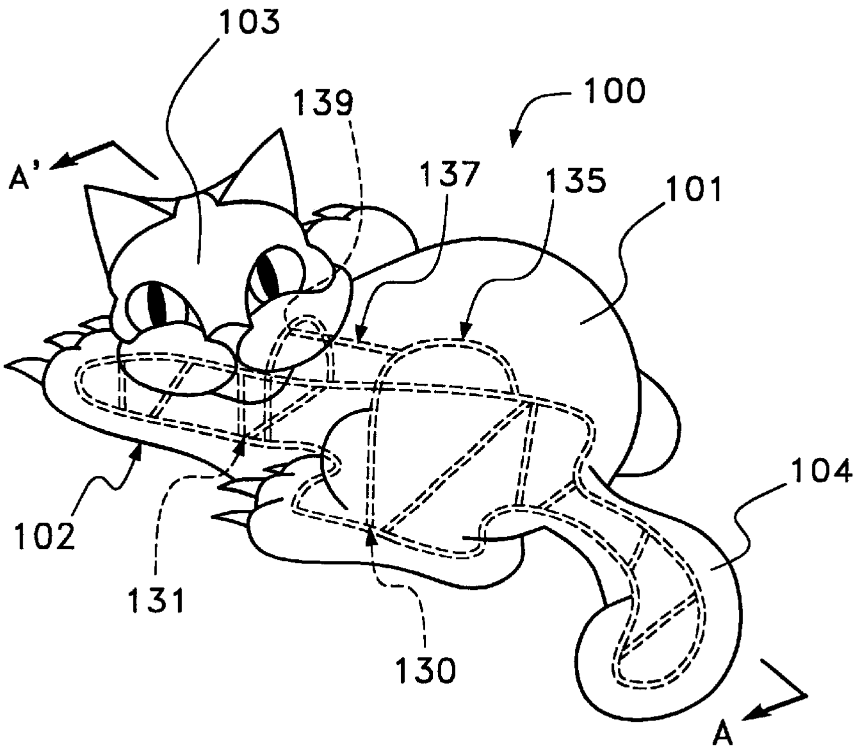
FIGS. 11, 12 and 13 show front oblique, cross-sectional and rear oblique views of a present invention device; and, FIGS. 14 and 15 show front and side cut views of another present invention device.
Figure 12:
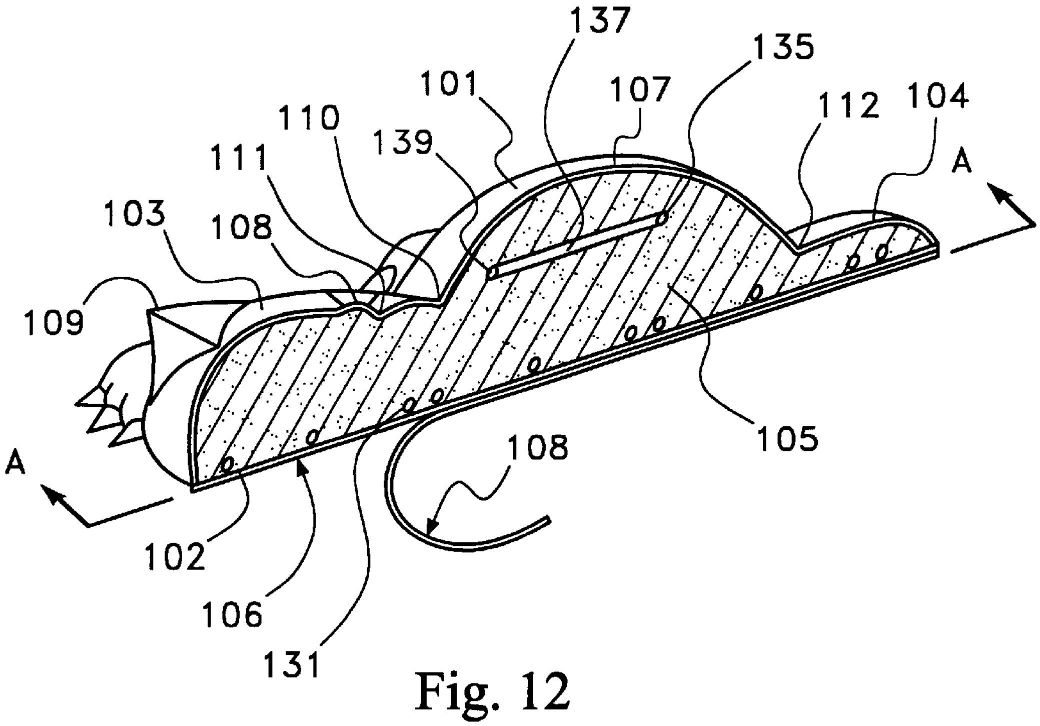
Figure 13:
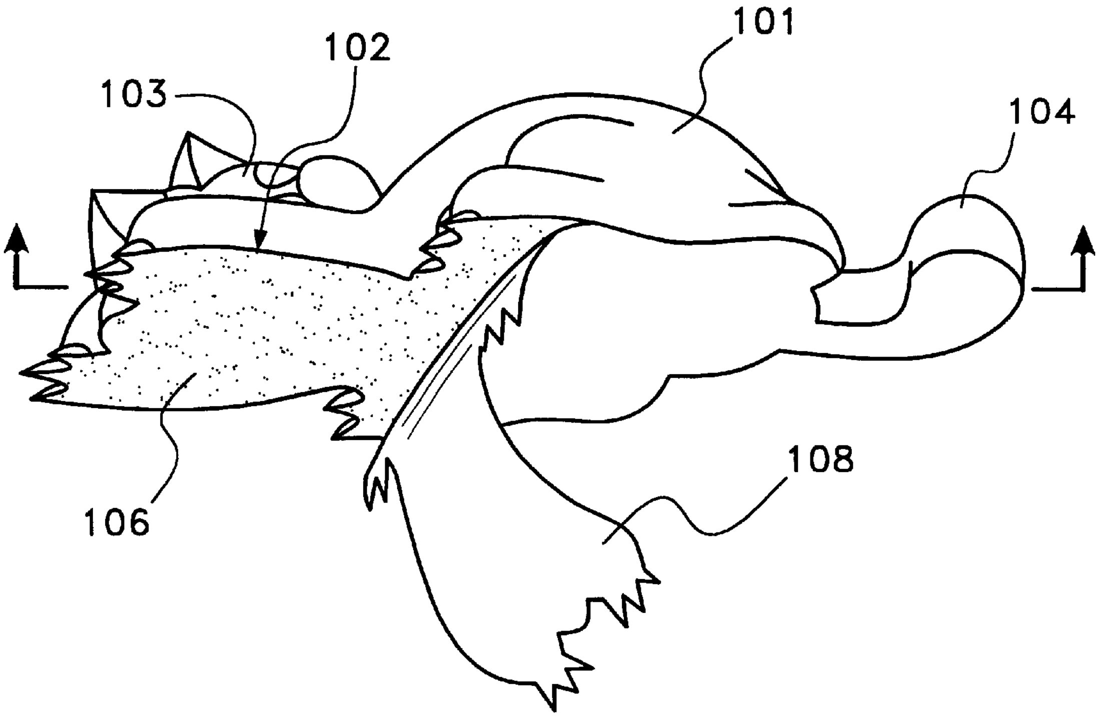

Referring now to FIGS. 11, 12 and 13 wherein identical parts are identically numbered, there is shown an oblique front view of another preferred embodiment of the detailed, decorative, three dimensional, sculptured item of the present invention. The embodiment consists of a decorative, three dimensional, sculptured, ornamental design 100, with back 101, head 103, tail 104 and a flat back surface 102. The peaks and the impressions thereon have varying elevations above the back surface 102. (This is vividly shown in FIG. 12.)

Also contained therein is a three dimensional plastic grid network 137, having much higher tensile strength than the remaining materials if construction. This grid network 137 includes a base layout 130 with cross-members, such as cross-member 131. It also includes arcuated uprights such as 135 and 139 and a connecting upper backbone 137.

FIG. 12 shows an oblique view of a cross-sectional cut of the present invention decorative, three dimensional item 100, cut along cross-sectional line A–A'. The oblique view from FIG. 12 shows cross-sections of the laminations and the semi-flexible molded blown foam material 105, as well as portions of grid network 130. This creates an embodiment of detailed, high strength, decorative, three dimensional, sculptured, ornamental item 100. FIG. 12 also shows a cross-section of the flat back surface 102 of the decorative, three dimensional item 100. The cross-section of the adhesive layer 106 that coats the flat back surface 102, and the cross-section of the protective, peelable, removable layer 108, that protects the adhesive later 106, and has the same dimensions of the flat back surface 102. FIG. 12 shows the protective, peelable, removable layer 108 in the partially removed position, exposing half of adhesive layer 106.

In addition, FIG. 12 illustrates the sculptured front peaks typified by peaks 107, 108, and 109 and impressions typified by impression 110, 111, and 112. These peaks and impressions have varying elevations relative to the back surface 102, creating true sculptured detail.

The view of the partially removed protective, peelable, removable layer 108, is best shown in FIG. 13. FIG. 13 shows an oblique view of the flat back surface 102 of the decorative present invention, three dimensional, sculptured, ornamental item 100.

The adhering technique is the same as for the decorative, three dimensional, sculptured, ornamental jewelry 1 described in conjunction with FIGS. 1, 2 and 3.

Figure 14:
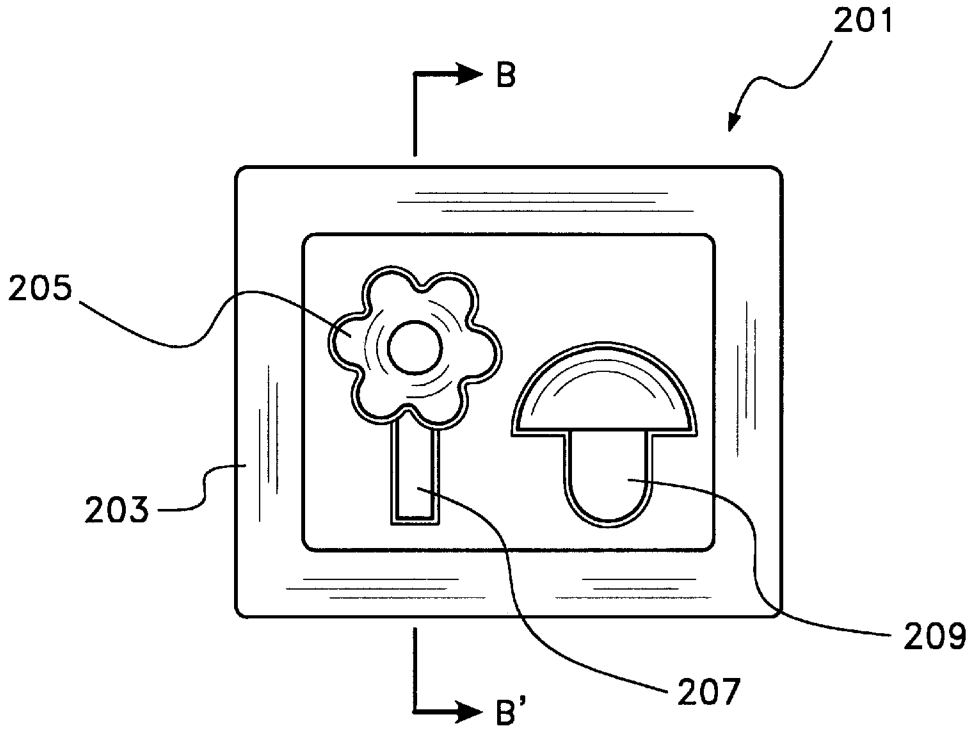
Figure 15:
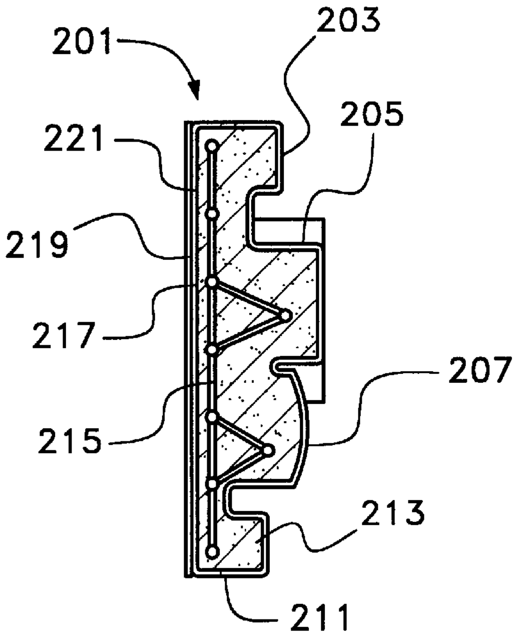

FIGS. 14 and 15 show another embodiment of the present invention. Decorative three dimensional, framed, simplistic art present invention device 201 is shown in its full front view in FIG. 14 and in its side cut view along cut line B–B' in FIG. 15.

Referring to both Figures wherein identical parts are identically numbered, there is a three dimensional, sculptured flower 205 with stem 207 and mushroom 209, as shown. There is a foam center core 213 encompassed by an integral skin 211 and a flat back 221. The foam center core 213 has embedded therein a three dimensional, interconnected grid 215. Back 221 includes a thin adhesive layer 217 and a peelable back layer 219. Device 201 is applied in a manner similar to that which is described above.

As mentioned, the plastic sculptured items of the present invention have substantially flat backs and three dimensionally sculptured fronts. These may be cast or molded and may be solid plastic or blown. Preferably, they are at least partially blown for some flexibility and economy of materials. It may be made of two distinct materials and may be filled. The choice of particular plastics, etc. is within the skill of the artisan. Likewise, colors, dyes, paints and finishes may be any conventionally available in the plastics industry. However, regardless of whether the present invention jewelry is formed by casting or molding with a single component, a layered structure or an integral skin foam, the cavity in a casting or sculpturing process must be such that it will create both peaks and impressions of varying elevations to yield true, detailed sculptured products.

Obviously, numerous configurations, colors and materials can be used in varied forms of the present invention. It is therefore understood that within the scope of the appended claims, the invention may be practiced otherwise than as specifically described herein.

What is claimed is:

1. A decorative, detailed, three-dimensional molded item which may be adhesively attached to a foreign surface which comprises:

(a) a detailed, molded, three-dimensional member, being constructed predominantly of non-conductive, semi-flexible material having a predetermined tensile strength, and having a front and a back, said member having a three-dimensional, predetermined ornamental design on its front and having a peaks and impressions, said peaks having varying elevations relative to said back and said impressions having varying elevations relative to said back, said non-conductive, semi-flexible material being a partially blown plastic foam molded material;

(b) a reinforcement grid of a plurality of strands of material having a tensile strength greater than the tensile strength of said semi-flexible material; and, (c) an adhesive material applied to at least a portion of said back in an amount sufficient to permit adherence thereof to a desired foreign surface.

2. The item of claim 1 wherein said partially blown plastic is an integral skin partially blown plastic foam.

3. The item of claim 1 wherein said reinforcement grid is a two-dimensional grid of flexible plastic strands.

4. The item of claim 1 wherein said reinforcement grid is a three-dimensional grid of flexible plastic strands.

5. The item of claim 1 which further comprises:

(d) a removable, peelable non-adhesive layer attached to the back of said member and over said adhesive for easy removal to expose the adhesive for a user.

6. The item of claim 1 wherein said reinforcement grid is a two-dimensional grid of plastic strands positioned within said semi-flexible material substantially parallel to said back of said item.

7. The item of claim 1 wherein said reinforcement grid is a three-dimensional grid of plastic strands which establish a single layer encompassing grid which encompasses a portion of said semi-flexible material.

* * * * *